(12) United States Patent
Diochon et al.

(10) Patent No.: US 8,038,092 B2
(45) Date of Patent: Oct. 18, 2011

(54) ENGINE ASSEMBLY FOR AIRCRAFT

(75) Inventors: Lionel Diochon, Toulouse (FR);
Jean-Michel Cetout, Toulouse (FR);
Laurent LaFont, Pechbusque (FR)

(73) Assignee: Airbus Operations SAS, Toulouse (FR)

( * ) Notice: Subject to any disclaimer, the term of this patent is extended or adjusted under 35 U.S.C. 154(b) by 718 days.

(21) Appl. No.: 12/088,450

(22) PCT Filed: Sep. 26, 2006

(86) PCT No.: PCT/EP2006/066765
§ 371 (c)(1),
(2), (4) Date: Mar. 28, 2008

(87) PCT Pub. No.: WO2007/036527
PCT Pub. Date: Apr. 5, 2007

(65) Prior Publication Data
US 2008/0272230 A1 Nov. 6, 2008

(30) Foreign Application Priority Data
Sep. 29, 2005 (FR) .................................... 05 52953

(51) Int. Cl.
*B64D 27/00* (2006.01)
(52) U.S. Cl. ...................................... 244/54
(58) Field of Classification Search ............. 244/54; 248/554–557; 60/796–797
See application file for complete search history.

(56) References Cited

U.S. PATENT DOCUMENTS

| | | | |
|---|---|---|---|
| 4,266,741 A * | 5/1981 | Murphy | 244/54 |
| 5,452,575 A * | 9/1995 | Freid | 60/797 |
| 5,497,961 A | 3/1996 | Newton | |
| 5,620,154 A * | 4/1997 | Hey | 244/54 |
| 5,746,391 A | 5/1998 | Rodgers et al. | |
| 7,093,996 B2 * | 8/2006 | Wallace et al. | 403/78 |
| 7,156,343 B2 * | 1/2007 | Marche | 244/54 |
| 2004/0108413 A1 | 6/2004 | Thompson | |

OTHER PUBLICATIONS

U.S. Appl. No. 12/064,924, filed Feb. 26, 2008, Diochon, et al.

* cited by examiner

*Primary Examiner* — Timothy D Collins
*Assistant Examiner* — Keith L Dixon
(74) *Attorney, Agent, or Firm* — Oblon, Spivak, McClelland, Maier & Neustadt, L.L.P.

(57) ABSTRACT

An aircraft engine assembly including a turbojet engine, an engine mount, and a plurality of engine attachments. The engine attachments include first and second forward attachments fixed to a fan case and located symmetrically in relation to a plane defined by a longitudinal axis of the turbojet engine and a vertical direction thereof, both forward attachments configured to transfer loads exerted in a longitudinal direction of the turbojet engine and in the vertical direction thereof. Moreover, each of the two forward attachments includes a shear pin mounted on the case and going through two walls of a clevis fixed on the engine mount.

10 Claims, 5 Drawing Sheets

ENGINE ASSEMBLY FOR AIRCRAFT

TECHNICAL FIELD

The present invention relates generally to an aircraft engine assembly, of the type comprising a turbojet engine, a securing pylon and a plurality of engine attachments inserted between this securing pylon and the turbojet engine.

PRIOR ART

In a known manner, the security pylon of this type of engine is provided to form a connecting interface between an engine, of the turbojet engine type, and an aircraft wing equipped with this assembly. It allows the loads generated by its associated turbojet engine to be transmitted to the airframe, and also provides a path for fuel lines, electric and hydraulic systems, and air between the engine and the aircraft.

To ensure load transmission, the engine mount comprises a rigid structure, for example of <<box>> type, i.e. formed by the assembly of spars and of side panels joined together via transverse ribs.

A mounting system is inserted between the engine and the rigid structure of the engine mount, this system globally comprising a plurality of engine attachments, usually distributed into forward and aft attachments integral with the fan case of the engine or the central engine case.

Additionally, the mounting system comprises a thrust mount device to transfer the thrust loads generated by the engine. In the prior art, this device is in the form, for example, of two side thrust links joined firstly to an aft part of the fan case of the engine, and secondly to an attachment mounted on the rigid structure of the engine mount, for example an attachment.

For information, it is specified that the engine mount is associated with a second mounting system inserted between this engine mount and the aircraft wing, this second system typically being made up of two or three attachments.

Finally, the engine mount is provided with a secondary structure to separate and support the different systems whilst carrying aerodynamic cowling.

In a manner known by one skilled in the art, despite the presence of the thrust mount device, these thrust loads generated by the engine typically cause more or less significant longitudinal bending of said engine, i.e. bending resulting from a torque exerted in a transverse direction of the aircraft.

When this type of longitudinal bending occurs, in particular during the cruising phases of the aircraft, one then encounters increased friction between the rotating compressor and turbine blades, and the central fan case of the engine.

Moreover, it is noted that the abovementioned longitudinal bending phenomenon, and therefore that of friction of the rotating blades, is largely accentuated by the fact that on current turbojet engines, the search for an ever-increasing by-pass ratio inevitably leads designers to increase the diameter of the fan in relation to that of the core of the turbojet engine.

The main consequence of the friction encountered resides in premature wear of the engine, which is naturally harmful for the lifespan of this engine, as well as for its performance. In another case where one has provided for suitable operating clearances such that there is almost never any contact caused by longitudinal bending, the output of the engine is then greatly decreased.

Thus, to face this problem, it has been proposed to implement a plurality of engine attachments including a first forward engine attachment and a second forward engine attachment fixed to the fan case of the engine and located symmetrically in relation to a plane defined by a longitudinal axis of the turbojet engine and a vertical direction thereof, the first and second forward engine attachments each being designed so as to transfer the loads exerted in a longitudinal direction of the turbojet engine and in a vertical direction thereof.

Providing first and second forward engine attachments on the fan case offers the possibility of greatly separating them from each other. This significant separation has the advantage of being able to considerably decrease the dimensions of these engine attachments, due to the fact that the loads they must transfer, associated at a moment in a given axis, are naturally weakened in relation to those encountered in the traditional solutions in which the engine attachments located near the central case could not be as far away from each other.

Furthermore, with this type of arrangement which also no longer requires the presence of a thrust mount device of the type having side thrust links, transferring all of the loads generated by the turbojet engine is essentially done on the fan case with the help of the first and second forward engine attachments, because the only link kept between the engine mount and the central case or the exhaust case is preferably formed by the aft engine attachment, the principal role of which is to limit the vertical oscillations of the aft part of the turbojet engine.

Thus, this particular arrangement of the engine attachments leads to a considerable decrease in the bending encountered at the level of the central case, whether this bending is due to the thrust loads generated by the turbojet engine, or due to the gusts likely to be encountered during the various phases of flight of the aircraft.

As a result, the aforementioned decrease in bending creates a significant drop in the friction between the rotating compressor and turbine blades and the central engine case, and therefore greatly limits the losses of output due to wearing of these blades.

Nevertheless, it must be noted that to date, no design has shown itself to be totally satisfactory for the first and second forward engine attachments, called side forward attachments. Indeed, the problems encountered in the known solutions are essentially made first of the significant bulk of these attachments, in particular due to the use of a clevis/link type assembly, and secondly of the presence of a very significant bending phenomenon at the level of a shear pin oriented transversely and mounted on the fan case of the turbojet engine, as well as on said link of the assembly.

SUMMARY OF THE INVENTION

The purpose of the invention is therefore to propose an aircraft assembly at least partially resolving the abovementioned drawbacks related to prior art embodiments, and also to present an aircraft having at least one such assembly.

For this purpose, the subject matter of the invention is an aircraft engine assembly comprising a turbojet engine, an engine mount and a plurality of engine attachments inserted between the engine mount and the turbojet engine, the plurality of engine attachments comprising a first forward engine attachment and a second forward engine attachment fixed to the fan case of the turbojet engine and located symmetrically in relation to a plane defined by a longitudinal axis of the turbojet engine and a vertical direction thereof, these first and second forward engine attachments each being designed so as to transfer the loads exerted in a longitudinal direction of the turbojet engine and a vertical direction thereof, and each comprising a shear pin oriented in a transverse direction of the turbojet engine and mounted on the fan case, as well as a clevis fixed on the engine mount and having two walls. According to the invention, for each of the first and second forward engine attachments, the shear pin goes through the two walls of the clevis.

As a result, with this type of arrangement, the first and second forward engine attachments are very compact, because it is no longer necessary to have a link cooperating with the clevis as was the case in the embodiments of the prior art, since it is now the shear pin which cooperates directly with this same clevis. Thus, other than the gain in terms of compactness of the forward attachments, gains are also achieved in terms of mass and cost.

Moreover, the pin therefore goes through the two walls of the clevis which are located away from each other, in the transverse direction. The shear pin is therefore solicited by two loads in opposite directions at the level of its two distinct points cooperating with the walls of the clevis, respectively, which makes it possible to obtain balancing of the pin advantageously translating to a considerable decrease of the bending effect previously encountered with the shear pin solicited in a single point by the link of the clevis/link assembly.

Preferably, the engine assembly also comprises a ball joint having a casing fixed on the fan case, and a ball-joint yoke supporting the shear pin. With this type of configuration, the pin mechanically solicited in bending advantageously transmits almost no stress to the fan case, since in this case, it is the ball-joint yoke integral with the shear pin which will move in its associated casing, built into the case. The presence of the abovementioned ball joint therefore implies that the fan case is substantially protected from the harmful effects likely to be caused by the bending of the shear pin mechanically connected to this same case.

Still preferably, the shear pin is mounted slidingly in the ball-joint yoke. This type of assembly has the advantage of allowing relative movement between the pin and the ball-joint yoke in a direction defined by the axis of the pin. This is particularly interesting in the sense that the engine can then be deformed without undergoing overstresses at the level of its area connected with the shear pin able to slide in the ball joint. For information, this specificity is in particular very advantageous during the elongation phases of the engine, which cause a non-negligible separation clearance between the fan case and the clevis of each side forward engine attachment.

Preferably, the plurality of attachments also comprises an aft engine attachment designed so as to transfer the loads exerted in the vertical direction of the turbojet engine. This aft engine attachment is then preferably designed so as to transfer only the loads exerted in the vertical direction of the turbojet engine, and the plurality of engine attachments also comprises a third forward engine attachment fixed to the fan case so as to be passed through by the aforementioned plane defined by the longitudinal axis of the turbojet engine and the vertical direction thereof, the third forward engine attachment being designed so as to transfer only the loads exerted in the transverse direction of the turbojet engine.

In this configuration, one can then provide that the first, second and third forward engine attachments are fixed on a peripheral annular part of the fan case, which enables them to occupy positions in which they are advantageously very separated from each other.

Preferably, the first and second engine attachments are passed through by a plane defined by the longitudinal axis of the turbojet engine and a transverse direction thereof. Thus, since loads are transferred at the axis of the turbojet engine, the longitudinal bending of the latter part is advantageously considerably decreased.

Lastly, it should be noted that an alternative consists of providing that the plurality of attachments does not comprise the abovementioned third forward attachment, but that the aft engine attachment is designed so as also to transfer loads exerted in a transverse direction of the turbojet engine, still with the goal of obtaining a plurality of engine attachments forming an isostatic assembly system and without a device for transferring thrust loads of the type having side thrust links.

A further subject of the invention is an aircraft comprising at least one engine assembly such as just presented.

Other advantages and characteristics of the invention will appear in the detailed, non-limiting description provided below.

BRIEF DESCRIPTION OF THE DRAWINGS

This description is made in reference to the appended drawings, in which.

DETAILED DESCRIPTION OF PREFERRED EMBODIMENTS

Figure 1:
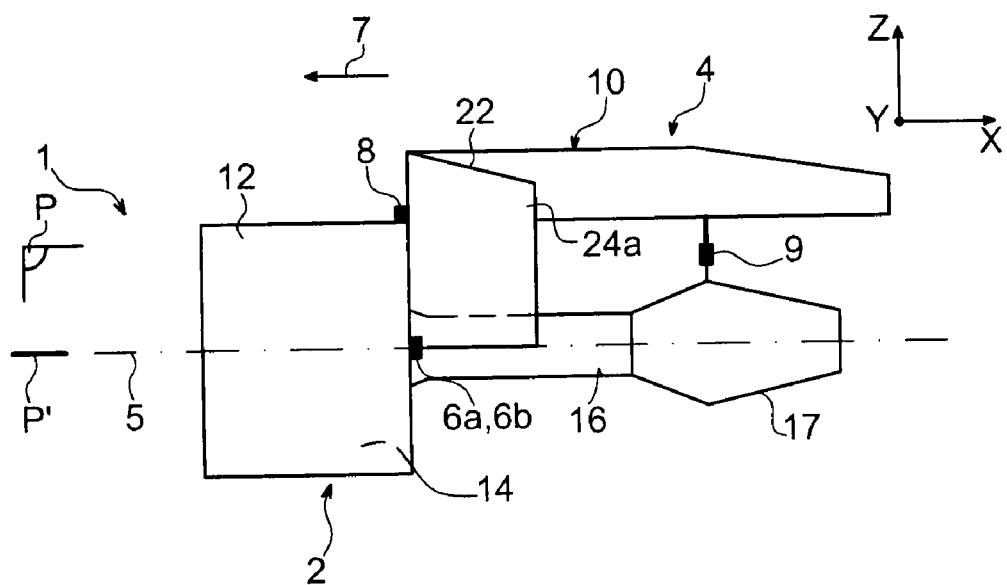
FIG. 1 illustrates a diagrammatic side view of an aircraft engine assembly, according to a first preferred embodiment of the present invention.

In reference to FIG. 1, one sees an aircraft engine assembly 1 according to a first preferred embodiment of the present invention, this assembly 1 being designed to be fixed under a wing of the aircraft (not illustrated).

Globally, the engine assembly 1 comprises a turbojet engine 2, an engine mount 4, as well as a plurality of engine attachments 6a, 6b, 8, 9 ensuring fixing of the turbojet engine 2 under this engine mount 4 (attachment 6b being concealed by attachment 6a in this FIG. 1). For information, it is noted that the assembly 1 is designed to be surrounded by a nacelle (not shown) and that the engine mount 4 comprises another series of attachments (not shown) making it possible to ensure the suspension of this assembly 1 under the wing of the aircraft.

In the remainder of the description, by convention, X designates the direction parallel to a longitudinal axis 5 of the turbojet engine 2, Y the direction oriented transversely in relation to this same turbojet engine 2, and Z the vertical direction or the height, these three directions lying orthogonal to each other.

Furthermore, the terms "forward" and "aft" are to be understood in relation to a direction of travel of the aircraft subsequent to the thrust exerted by the turbojet engine 2, this direction being schematically illustrated by arrow 7.

In FIG. 1, one can see that only one rigid structure 10 of the engine mount 4 was shown. The other component elements of this engine mount 4 not shown, such as the secondary structure ensuring the separation and support of the different systems whilst carrying aerodynamic cowling, are conventional elements identical or similar to those found in the prior art, and known by persons skilled in the art. As a result, no detailed description of these elements will be provided.

Furthermore, the turbojet engine 2 has, at the front, a large fan case 12 delimiting an annular fan duct 14, and toward the rear comprises a central case 16 of smaller size, enclosing the core of this turbojet engine. Lastly, the central case 16 is extended aftward by an exhaust case 17 of larger size than the case 16. The cases 12, 16 and 17 are evidently secured to one another.

As one can see in FIG. 1, a first forward engine attachment 6a as well as a second forward engine attachment 6b are both fixed on the fan case 12, symmetrically in relation to a plane P defined by the axis 5 and the direction Z.

Figure 2:
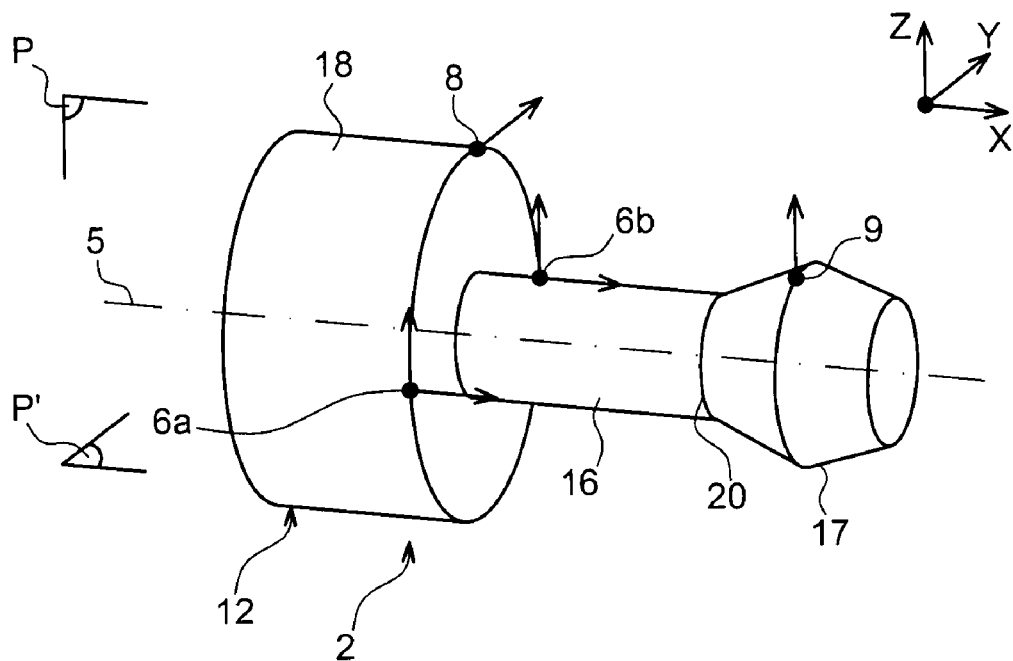
FIG. 2 shows a diagrammatic perspective view of the turbojet engine of the assembly shown in FIG. 1, the engine mount having been omitted to more clearly show the arrangement of the engine attachments.

Indeed, in reference now to FIG. 2, one can see that the first attachment 6a and the second attachment 6b illustrated diagrammatically are arranged symmetrically in relation to this plane P, and preferably both arranged on a peripheral annular part of the fan case 12, and more specifically on the rear of this same part.

One can then provide that the first and second forward engine attachments 6a, 6b are diametrically opposed on the peripheral annular part having a cylindrical external surface 18 of the fan case 12, such that these attachments 6a, 6b are therefore each crossed through by a second plane P′ defined by the longitudinal axis 5 and the direction Y.

As shown diagrammatically by the arrows of FIG. 2, each of the first and second forward engine attachments 6a, 6b is designed so as to be able to transfer the loads generated by the turbojet engine 2 in the direction X and in the direction Z, but not those exerted in the direction Y.

In this way, the two attachments 6a, 6b, greatly distanced from one another, jointly ensure transferring of the moment exerted in direction X, and that of the moment exerted in the direction Z.

Still in reference to FIG. 2, one can see a third forward engine attachment 8 illustrated diagrammatically and also fixed on the peripheral annular part of the fan case 12, also preferably on the rear of this part.

The attachments 6a, 6b, 8 are fixed on the peripheral annular part of the case 12 via structural parts (not shown) of the engine, which are preferably arranged on the rear of the peripheral annular part. Nevertheless, it is also possible to encounter engines whereof the structural parts are located more forwardly on the peripheral annular part, implying that the attachments 6a, 6b, 8 are also fixed more forwardly in relation to the engine, still on the peripheral annular part of the fan case 12.

The third attachment 8 is located on the highest part of the fan case 12, therefore on the highest part of the peripheral annular part, and as a result is fictitiously passed through by the first plane P indicated above. Moreover, the three attachments 6a, 6b and 8 are preferably passed through by a plane YZ (not shown).

As shown diagrammatically by the arrows of FIG. 2, the third engine attachment 8 is designed so as to be able to transfer only the loads generated by the turbojet engine 2 in the direction Y, and therefore not those exerted in the directions X and Z.

Still in reference to FIG. 2, one can see an aft engine attachment 9 shown diagrammatically, and fixed between the rigid structure 10 (not visible in this figure) and the exhaust case 17, preferably at the portion of this case 17 having the largest diameter. For information, it is specified that this aft attachment 9 is preferably fictitiously passed through by the first plane P.

As diagrammatically shown by the arrows of FIG. 2, the aft engine attachment 9 is designed so as to be able to transfer only the loads generated by the turbojet engine 2 in the direction Z, and therefore not those exerted in the directions X and Y.

In this way, this attachment 9 therefore ensures, jointly with the two forward attachments 6a, 6b, transferring of the moment exerted in the direction Y.

Naturally, this aft attachment 9 could be placed differently, i.e. on the central case 16 of the turbojet engine 2, preferably on an aft part thereof, or also at the level of a junction 20 between the central case 16 and the exhaust case 17.

It is noted that while the engine attachments 8 and 9 were shown diagrammatically in FIGS. 1 and 2, it must be understood that these attachments can be made according to any form known by those skilled in the art, such as, for example, that relative to the assembly of links and brackets. However, the design of the forward attachments 6a, 6b constitutes a specificity of the present invention, and will be described in detail below in reference to FIGS. 5 and 6.

As previously stated, one of the principal advantages associated with the configuration just described resides in the fact that the specific position of the forward engine attachments 6a, 6b, 8 on the fan case 12 leads to a considerable decrease in the bending of the central case 16 during the various flight situations of the aircraft, and therefore causes a significant decrease in wear due to friction of the compressor and turbine blades against this central case 16. Moreover, another advantage resides in the possibility of decreasing operational clearances during manufacturing of the engine, and therefore obtaining better output.

Figure 4:
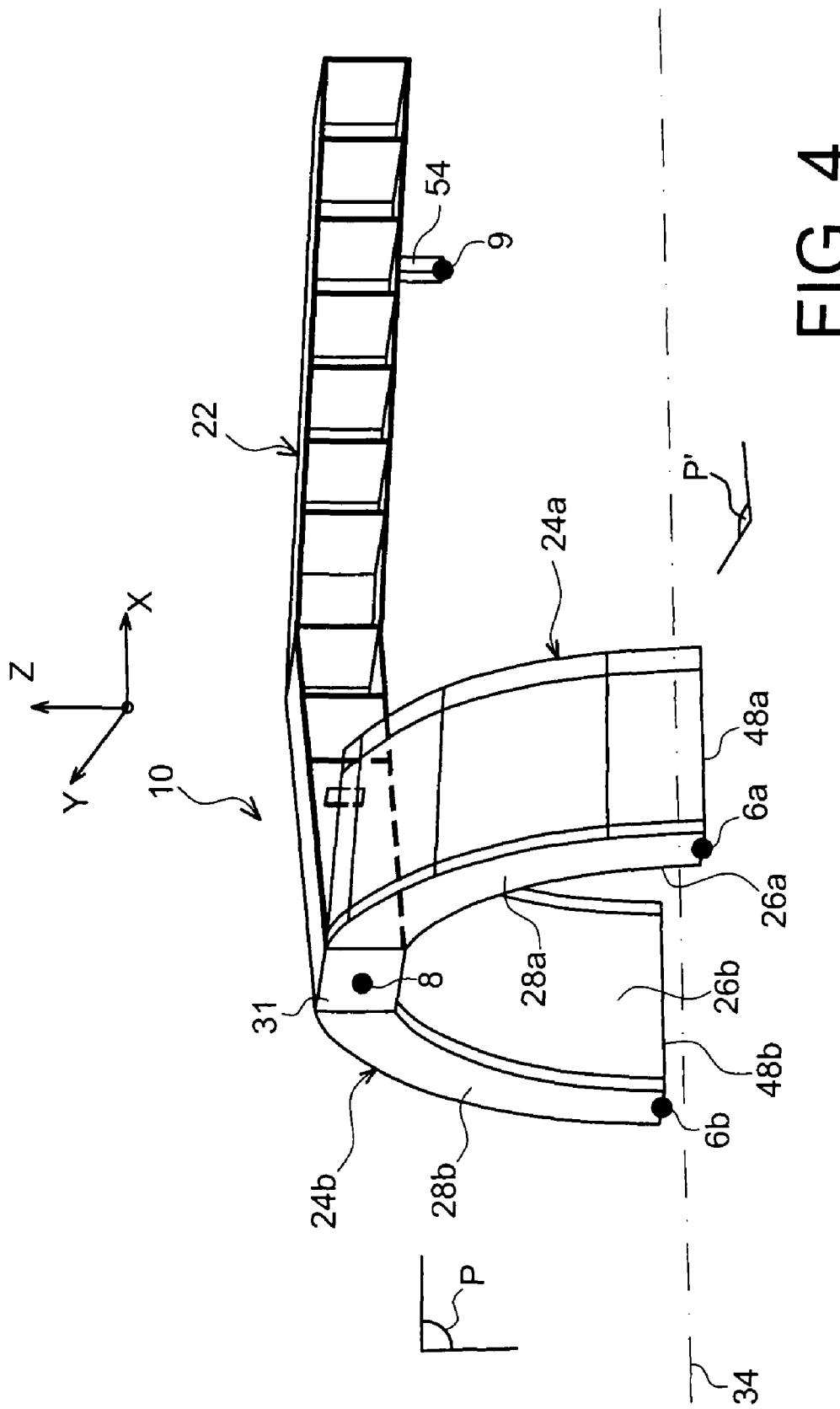
FIG. 4 shows a perspective view of the engine mount of the assembly shown in FIG. 1.

In reference to FIG. 4, one can see one embodiment of the engine mount, whereof only the rigid structure 10 has been illustrated.

First, it must be stated that this rigid structure 10 is designed so as to be symmetrical in relation to the first plane P indicated above.

This rigid structure 10 comprises a central torque box 22, which extends from one end to the other of the structure 10 in the direction X, substantially parallel to this same direction. For information, this box 22 can be formed by the assembly of an upper spar, a lower spar, and two side panels (not referenced) extending in the direction X in the parallel planes XZ, connected to each other by transverse ribs (not shown) which are oriented in parallel planes YZ.

Moreover, at the level of one forward end of this box 22, the rigid structure 10 supports two lateral boxes 24a, 24b protruding on either side of the box 22 in the direction Y.

The two lateral boxes 24a, 24b respectively support the two forward engine attachments 6a, 6b, and preferably each have a lower skin 26a, 26b together delimiting a part of a substantially cylindrical fictitious surface (not shown) having a circular cross-section, and a longitudinal axis 34 parallel to the central box 22 and to the longitudinal axis 5 of the turbojet engine. In other words, the two lower skins 26a, 26b each have a curvature adapted to be able to position themselves around and in contact with this fictitious surface, over their entire length. Thus, in general, the two lateral boxes 24a, 24b form a substantially cylindrical envelope/cage portion having a circular cross-section, able to be positioned around and away from the central case 16 of the turbojet engine 2. Of course, this configuration promotes the flow of secondary airflows through the assembly 1.

Moreover, one can see that the forward engine attachment 6a is secured to a forward closure frame 28a of the lateral box 24a, while the forward engine attachment 6b is made integral with a forward closure frame 28b of the lateral box 24b, as diagrammatically illustrated in FIG. 4, also showing that the forward engine attachment 8 is mounted on a forward closure frame 31 of the box 22, the frames 28a, 28b, 31 being arranged in a same plane YZ.

Moreover, one also provides for fixing the forward engine attachments 6a, 6b on the closure plates 48a, 48b, respectively, parallel to the plane P' and preferably crossed through by this same plane, these closure plates 48a, 48b closing a lower part of the box 24a and a lower part of the box 24b, respectively, and therefore connecting the lower ends of the skins and the forward and aft closure frames of the associated box.

Figure 3:
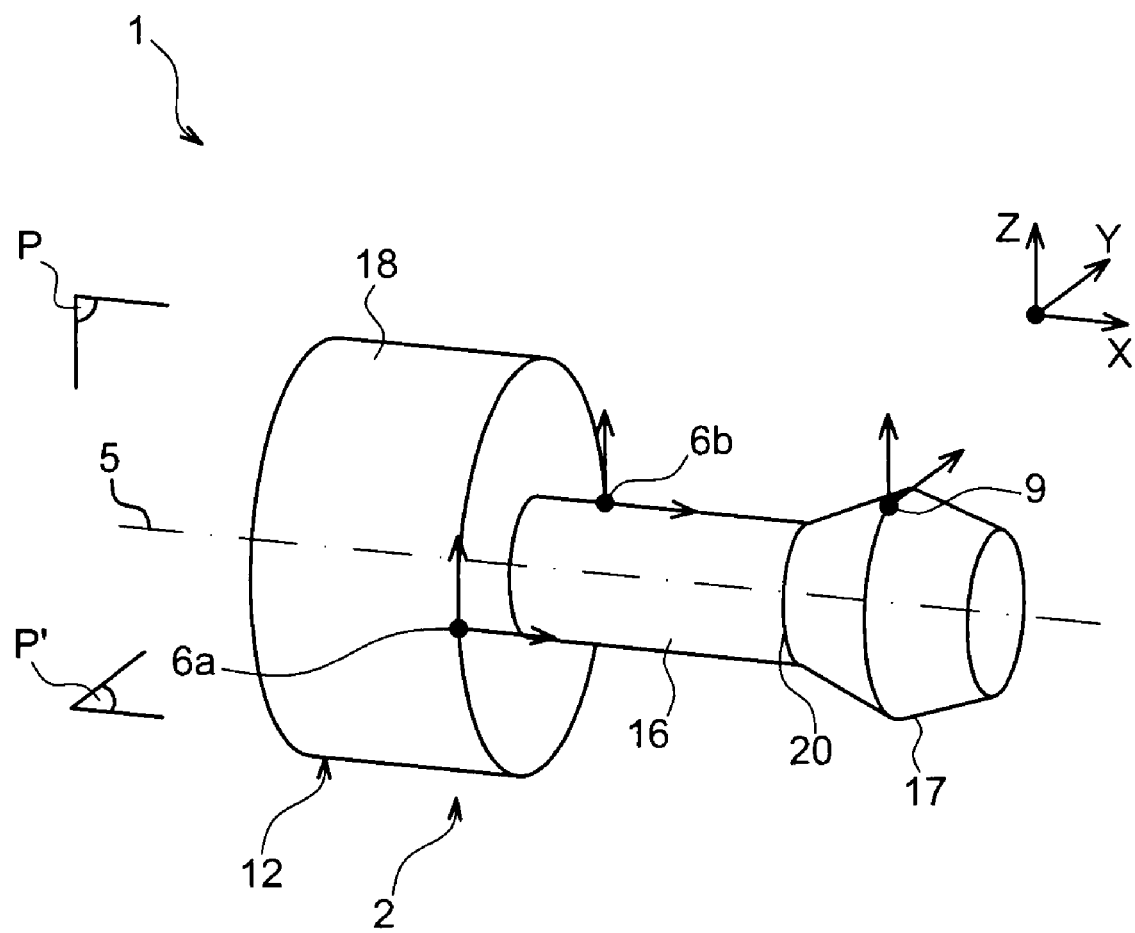
FIG. 3 shows a view similar to that shown in FIG. 2, the assembly being presented in the form of a second preferred embodiment of the invention.

In reference to FIG. 3, one can see an aircraft engine assembly 1 according to a second preferred embodiment of the present invention (the engine mount not being shown).

This assembly is similar to that described in the framework of the first preferred embodiment. Thus, elements bearing the same numerical references correspond to identical or similar elements.

The main difference presented by this second preferred embodiment consists of removing the third forward engine attachment, and providing that the aft engine attachment 9 ensures not only transferring of the load exerted in the direction Z, but also that of the load being exerted in the direction Y.

Thus, this second preferred embodiment, like the first, provides an alternative making it possible to obtain a plurality of engine attachments forming an isostatic assembly system.

Figure 5:
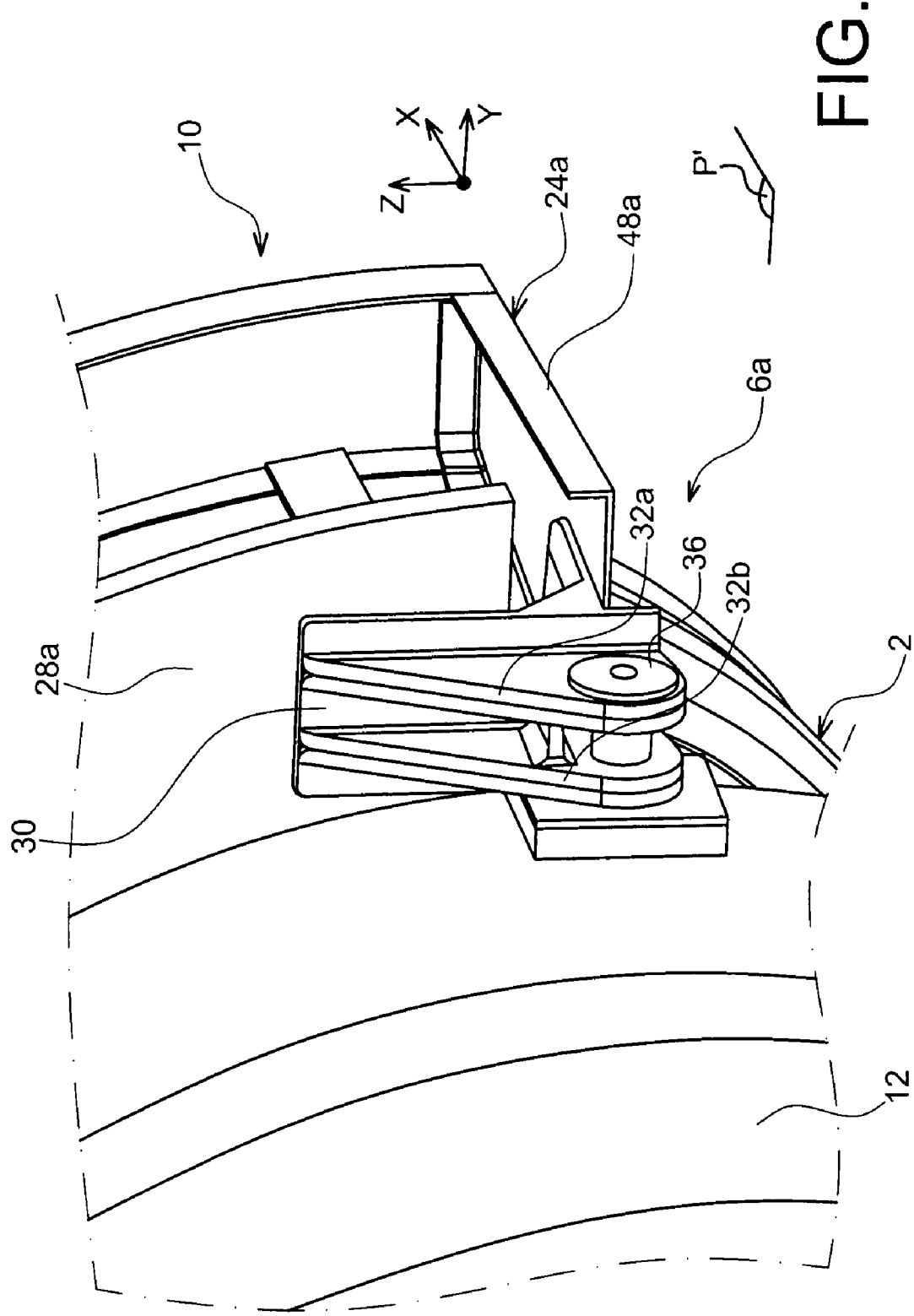
FIG. 5 shows a detailed perspective view of a forward attachment belonging to the engine assembly shown in FIG. 1.
Figure 6:
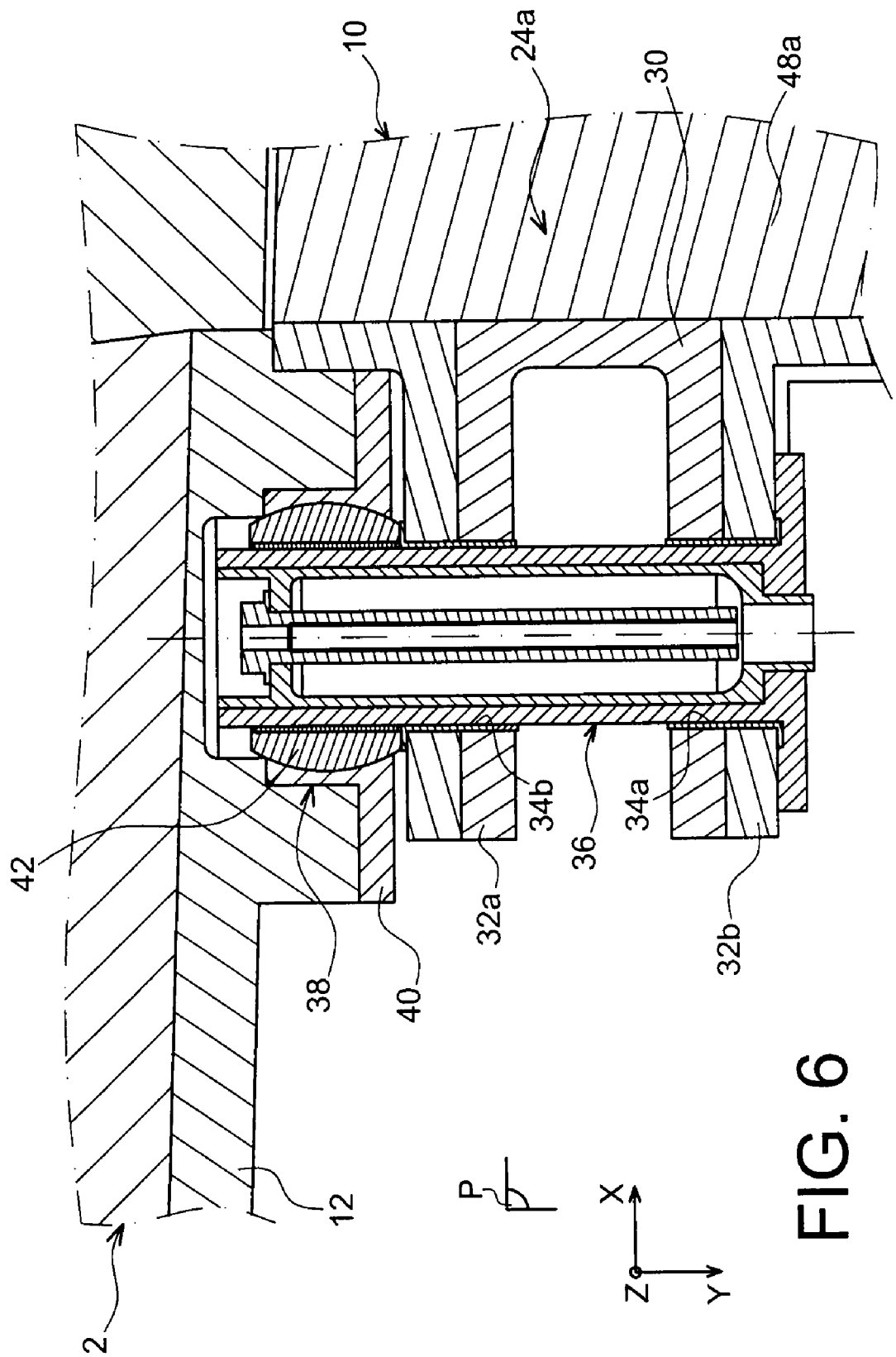
FIG. 6 shows a partial cross-section of this same forward attachment, along plane P' of FIG. 5.

In reference now to FIGS. 5 and 6, showing the side forward engine attachment 6a, identical and of course symmetrical to the side forward engine attachment 6b in relation to the plane P, one can see that this comprises a clevis 30 integral with the forward closure frame 28a and the closure plate 48a of the lateral box 24a, this clevis 30 having two walls or heads 32a, 32b spaced in the direction Y, and each being arranged along a plane XZ.

The two walls each have an orifice 34a, 34b also oriented in the direction Y, and which are successively passed through by an exterior end of a shear pin 36. More precisely, the shear pin 36 oriented in the direction Y is built into the walls of the clevis 30, such that it is possible to consider that the pin 36 is integral with this clevis.

It is specified that the walls and the shear pin can be of the "double" type, in order to fill a safety role, also know as a "Fail Safe" function.

Furthermore, the shear pin 36 comprises an interior end mechanically connected to the fan case 12, as is best visible in FIG. 6. The mechanical connection is achieved via a ball joint 38 comprising a casing 40 built into the case 12, and supporting a ball-joint yoke 42 pierced in order to receive the interior end of the pin 36. Here, however, a sliding assembly of the pin 36 in the ball-joint yoke 42 is preferable in order to allow relative movement between these two elements in the direction defined by the combined longitudinal axes of the pin 36 and the piercing of the yoke 42, therefore corresponding to the direction Y.

Of course, various modifications can be made by those skilled in the art to the aircraft engine assembly 1 just described, solely as a non-limiting example. In this respect, one can in particular indicate whether the engine assembly 1 has been presented in a configuration adapted for its mounting under the aircraft wing, this assembly 1 could also have a different configuration enabling it to be mounted above this same wing, or even at an aft part of the aircraft fuselage.

The invention claimed is:

1. An aircraft engine assembly comprising:
    a turbojet engine;
    an engine mount; and
    a plurality of engine attachments inserted between the engine mount and the turbojet engine, the plurality of engine attachments including a first forward engine attachment and a second forward engine attachment fixed to a fan case of the turbojet engine and located symmetrically in relation to a plane defined by a longitudinal axis of the turbojet engine and a vertical direction thereof, the first and second forward engine attachments each configured to transfer loads exerted in a longitudinal direction of the turbojet engine and in the vertical direction thereof during normal operation, and each of the first and second forward engine attachments including
        a shear pin oriented in a transverse direction of the turbojet engine and mounted on the fan case, and
        a clevis fixed on the engine mount and including two walls,
    wherein for each of the first and second forward engine attachments, the shear pin goes through both walls of the clevis.

2. The aircraft assembly according to claim 1, further comprising a ball joint including a casing fixed on the fan case, and a ball-joint yoke supporting the shear pin.

3. The aircraft assembly according to claim 2, wherein the shear pin is slidingly mounted in the ball-joint yoke.

4. The aircraft assembly according to claim 1, wherein the plurality of attachments further comprise an aft engine attachment configured to transfer loads exerted in the vertical direction of the turbojet engine.

5. The aircraft assembly according to claim 4, wherein the aft engine attachment is configured to transfer only the loads exerted in the vertical direction of the turbojet engine, and wherein the plurality of engine attachments further comprise a third forward engine attachment fixed to the fan case so as to be passed through by the plane defined by the longitudinal axis of the turbojet engine and the vertical direction thereof, the third forward engine attachment configured to transfer only loads exerted in the transverse direction of the turbojet engine.

6. The aircraft assembly according to claim 5, wherein the first, second, and third forward engine attachments are fixed on a peripheral annular part of the fan case.

7. The aircraft assembly according to claim 1, wherein the first and second forward engine attachments are passed through by a plane defined by the longitudinal axis of the turbojet engine and a transverse direction thereof.

8. The aircraft assembly according to claim 4, wherein the aft engine attachment is further configured to transfer loads exerted in a transverse direction of the turbojet engine.

9. The aircraft assembly according to claim 1, wherein the aft engine attachment is fixed on a central case of the turbojet engine.

10. The aircraft assembly according to claim 1, wherein the plurality of engine attachments form an isostatic assembly system.

* * * * *